…

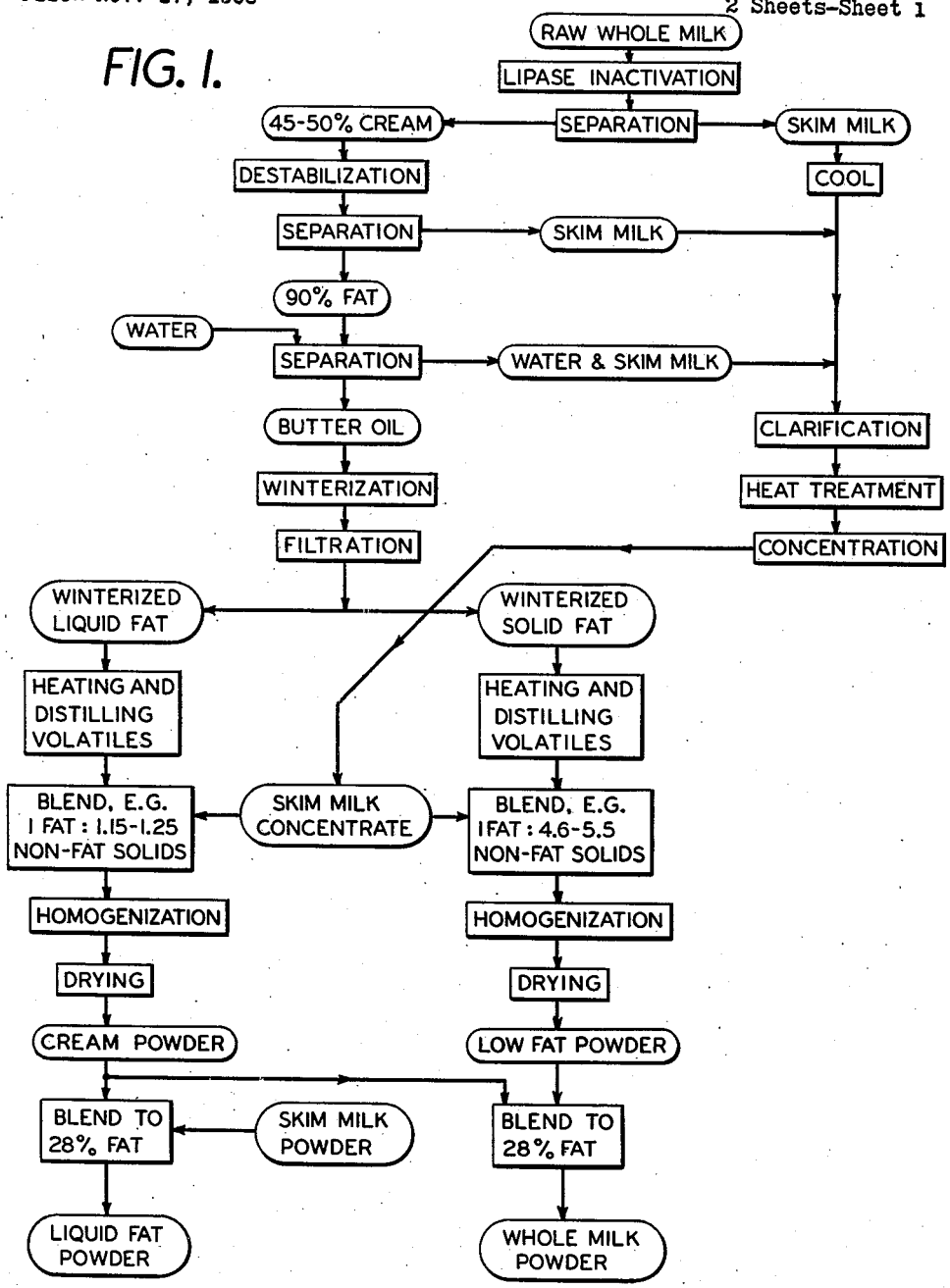

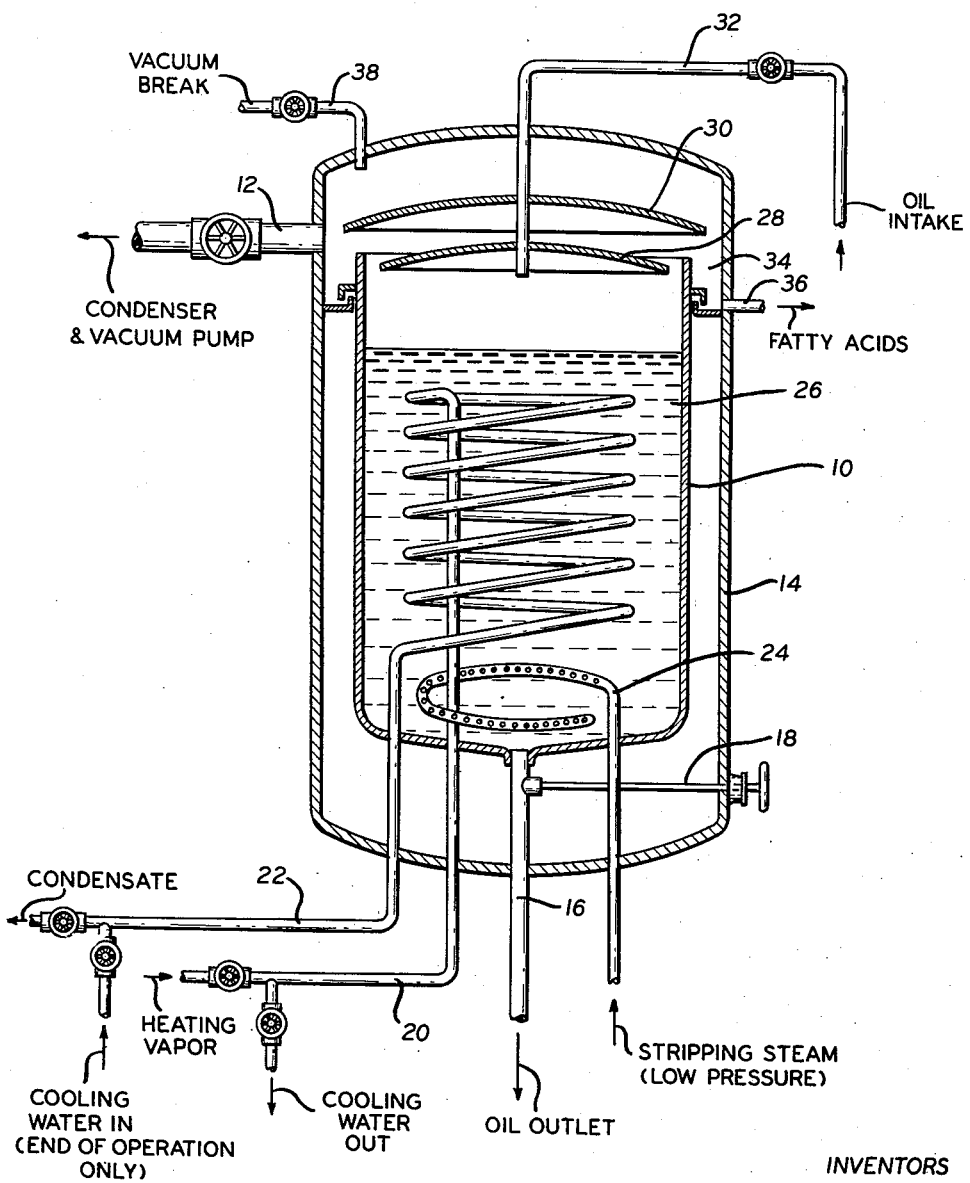

United States Patent Office 2,966,409
Patented Dec. 27, 1960

2,966,409

MILK PRODUCT

Alexander W. Williams and Richard H. Beckman, Syracuse, and Donald E. Mook, De Witt, N.Y., assignors to The Borden Company, New York, N.Y., a corporation of New Jersey Filed Nov. 17, 1958, Ser. No. 774,354

10 Claims. (Cl. 99—56)

This invention relates to a dry milk product containing butter fat.

The invention is particularly useful in making whole milk powder of improved rate of mixing and dispersing in water.

The invention comprises the herein described milk product and the process of making it in which the liquid portion of the butter fat is associated with a part of the non-fat solids of milk and the winterized solid butter fat with another part of the non-fat milk solids. The product of the invention of chief interest is a blend of two components, one component being a homogenized and then dried mixture of an aqueous dispersion of non-fat milk solids with a high proportion of winterized liquid butter fat and the other component being a similarly homogenized and dried mixture of non-fat milk solids with a relatively low proportion of the winterized solid butter fat. The term "winterized solid" is applied to the solid fat fraction which separates when the butter fat, previously warmed until it is molten, is cooled to conventional winterizing temperature for the whole fat.

The component containing the very large proportion of liquid fat—normally equal or almost equal to the non-fat milk solids therein—reconstitutes with water quite rapidly. In contact with the reconstituting water, the globules of fat separate from the solids which are then accessible to the water. The other component with the low proportion of solid fat disperses more rapidly than whole milk powder of the prior art. Mixing the two component powders, to a blend of about 28% fat, produces a whole milk powder which is readily dispersible because of the character of the component powders. The separation of the fats which are liquid at 70° F. from the fats which are solid at 70° F., by their being incorporated in their own separate portions of solids-not-fat, avoids such intermingling of these fats as would give, if permitted and as occurs in natural butter fat, a semi-fluid, pasty condition of the fat causing a hydrophobic, not easily floated away coating that prevents ready access of water to all parts of the milk powder during reconstitution. The winterized solid fat, in storage, does not coat over the particles of milk powder as thoroughly as does the whole butter fat, thereby permitting more rapid reconstitution with water.

The invention will be illustrated in connection with the attached drawing.

Fig. 1 is a flow sheet for our process.

Fig. 2 is a diagrammatic side elevation of a vacuum-steam stripper to improve flavor.

Tank 10 is in communication with a condenser and vacuum pump of usual kind (not shown) through line 12, disposed in an air chamber within the shell or enclosure 14, provided with draw-off line 16 with valve 18, and heated by vapor of any convenient kind such as o-dichlorobenzene or a mixture of diphenyl and diphenyl oxide, supplied through line 20 with condensate return line 22.

The sparger 24 for supplying the stripping steam or an inert gas is located near the bottom of the charge of oil 26 in the tank. Baffle plate 28 is disposed above the charge of oil and drip plate 30 above the baffle. The oil intake line 32 delivers the oil at a position below plate 28. An annular recess 34 extends around the inside of shell 14, between the tank 10 and the outer shell 14 at such position that any backdrip which forms or falls on the plate 30 or on the inside of said enclosure above the annular space 34 is withdrawn through the outlet 36.

The vacuum break line 38 restores the pressure to normal at the conclusion of the treatment of the batch of the oil, in this case butter fat.

The operation of the stripping device will be largely evident from the description of the equipment that has been given. The oil is heated to a temperature of about 350°–450° F., and usually 375°–425° F. The stripping inert gas, here low pressure steam, is introduced through the holes in the sparger, all under a pressure such as about 2–7 mm. of mercury. The materials that are volatile under these conditions, or that are made volatile by the heating step, either pass through the line 12 or condense as "dew" in the upper part of the equipment and return to the annular recess 34, the materials collected in the said recess being mostly fatty acids that flow away through the outlet 36. Materials that are volatilized and do not condense in the cooler part of the equipment go to the condenser and vacuum pump, the material so recovered being retained as flavoring material for various food products.

The oil 26 that is left in the tank after the stripping operation is completed, as after 1–4 hours, i.e. after substantially no more volatiles are being recovered, is stabilized in flavor and is incorporated into a milk product as described elsewhere herein. This oil consists essentially of fatty glycerides that are not distillable under the conditions used, as at about 400° F. at 2 mm. pressure.

All treatments indicated in the flow sheet are effected under usual conditions and with equipment commonly used for such steps, except as stated to the contrary or specifically described.

Starting with raw whole milk, for example, the milk, in a representative processing, is first clarified to remove dirt, body cells, enzymes, and the like. Ordinarily the clarified milk is then flash heated as to about 125° F., to inactivate or control remaining lipases.

While raw whole milk is ordinarily used to provide the fat and milk solids for our process and product, other sources may be used, as, for example, pasteurized whole milk, cream (up to 40%–58% fat), plastic cream (up to 75%–85% fat), and hydrous or anhydrous butter oils (fat) in a mixture with skim milk or skim milk powder. Depending upon the starting material selected, various steps of Fig. 1 may be omitted and other conventional milk processing steps may be added, for their usual functions. In any case, the butter fat is winterized, i.e., cooled in originally molten condition to winterizing temperatures and the solid fraction so formed separated from the remaining liquid fat, and the liquid fraction and solid fractions are mixed with milk solids-not-fat. The invention utilizes substantially all the components of whole milk in a satisfactory and acceptable form.

Suitable winterizing temperatures are 60°–85° F. and for best results 70°–85° F. The solid fraction so obtained usually amounts to about half the weight of the liquid fat, the exact proportion depending upon the temperature of winterizing.

The fat fractions, either with or without the heating and distillation treatment, are homogenized with skim milk solids dispersed in water, ordinarily a fluid skim milk or a concentrate thereof. The processed fats, i.e. the winterized liquid fat and the winterized solid fractions, are homogenized separately with the milk solids dispersion at a temperature above the melting point of the fat fractions. If the fat being homogenized is the solid fraction from the winterizing step, then it is warmed and homogenized at a temperature above its melting point, as at about 130°–140° F. The winterized liquid fraction of the fat is homogenized to advantage at a temperature around 100°–110° F. or somewhat lower.

In homogenizing the two winterized fractions of the butter fat with the dispersion of skim milk solids, there is ordinarily a strong divergence in the proportions of the two kinds of fat that are introduced. When the fat introduced into the skim milk fluid or concentrate is the winterized liquid butter fat, then the proportion of the said fat to non-fat solids of the skim milk is made very large, as up to about half of the total of such fat and non-fat milk solids. We desire to keep the proportion of the winterized liquid butter fat at about 1 part to 1–3, or 1–1.5 and, for best results, to 1.15–1.25 parts of the non-fat solids of the milk. Lower proportions of the liquid fat may be used. This high proportion of the liquid fat works satisfactorily, however. It gives, after drying the homogenized product, a powder in which the fat re-suspends quickly and without producing a specky condition (fat particles) when reconstituted in water at 70°–80° F. We consider that the rapid miscibility and dispersibility, in spite of the high proportion of fat, is due in part at least to the association of the winterized liquid fat with the skim milk solids in such manner that the fat is quickly floated from the particles of the powder by the reconstituting water which is ordinarily as warm as the temperature of winterizing.

With the solid fraction of the winterized butter fat, on the other hand, the proportion of the fat which is homogenized with the skim milk solids may be as high as 1 part of the solid fat to 2 of non-fat solids, but for best results, is 1 part of the fat to 4–5 parts of the said solids. Lower proportions of solid fat to non-fat solids may be employed, but they require larger proportions of liquid fat-non-fat solids component in producing a dry whole milk powder. The homogenized and then dried combination of the solid fat with the milk solids, in spite of the fat content, wets and sinks about as rapidly in reconstitution as ordinary skim milk powder. The rate of reconstitution of this solid fat fraction may be increased by removal of dust and fine solid particles from the product and returning them for reconstitution and redrying. Other known means for increasing the rate of reconstitution may be employed, if desired. Such treatment is not necessary to acceptance of the product, particularly after blending the milk powders containing separately the liquid and the solid fats.

In this blending, the two powders, resulting from homogenizing the milk solids-not-fat with the two kinds of butter fat separately and then drying to powder form, are mixed finally with each other in proportions selected to make a finished standard whole milk powder in which the percentage of total fat is that required for such powder, that is, a minimum of at least approximately 26% of total fat. Thus the two component powders are mixed in such amounts as to give 1 part of total fat for approximately 2.7 of non-fat milk solids in 26% milk powder and 1 part of the fat to 2.47 parts of non-fat milk solids in whole milk powder of 28% butter fat content.

Products made as described have a taste that is satisfactory, very similar after reconstitution in water to commercial homogenized milk, and the powder remains substantially stable even after storage for many months.

The invention is further illustrated by the description in connection with the following specific examples of the practice of it. In these examples and elsewhere herein proportions are expressed as parts by weight unless specifically stated to the contrary.

EXAMPLES OF PROCESSING

*Example 1*

Raw whole milk of any fat and total solids content is given a flash heat treatment of 115°–130° F., the exact temperature selected depending on the lipase activity, to inactivate or control the lipase system. The milk may then be cooled to 60°–70° F. and separated in a cold milk separator, or separated without cooling, to produce 45%–50% cream and skim milk.

After cooling the cream to about 40° F. and holding at this temperature for about 1 hour or more, the cream is pumped at 60°–70° F. through a destabilizing unit which churns the fat. This destabilized cream is then heated to 160° F. and delivered into a centrifuge for separating butter oil from the aqueous phase which discharges skim milk and a product of 88%–90% fat. The skim milk from this separator is added back to the skim milk from the first separation process, to avoid loss of milk solids.

This 88%–90% fat product containing fat membrane material, skim milk solids, and water is diluted to 40%–50% fat with water at 140° F. in a tank, agitated, and then fed a second time through the same centrifuge or continuously fed through a second centrifuge. This separation produces butter oil of about 99.6% fat and water containing some skim milk solids. The skim milk and water mixture is recovered by adding back to the skim milk from the previous separations.

The skim milk resulting from the various separation processes is clarified further to remove fat membrane materials and any other materials which might contribute to the development of oxidized flavor in milk powder. This clarified skim milk is given a flash heat treatment of 210° F. and concentrated to 36% available solids-not-fat in a conventional vacuum concentrator preferably at the lowest possible temperature to prevent heat flavors, i.e. 110° F. although temperatures up to 150° F. may be used. This concentrated skim milk is used to provide skim milk solids used later in the process.

The butter oil produced by the above process is delivered at 80°–85° F. to a tightly covered vat with water jacket and internal cooling device and cooled further to approximately 70° F. With the oil in the vat, the water in the cooling system is maintained at 70° F., which results in a drop of about 1° F. every 5 minutes, to the winterizing temperature of 70° F. This results in slow cooling of the butter oil and causes crystallization of those fats which are solid at 70° F. The resulting semi-solid mixture of fat is held until crystallization of solid fat is complete and is then forced by gas pressure or by gravity to a filtering device to separate the winterized liquid and solid fats.

The liquid fat, to which 0.075% by weight of citric acid has been added to inactivate metallic contamination, is transferred to steam stripping (deodorizing) equipment as in Fig. 2 which is under reduced pressure of 5–7 mm. of mercury absolute. After the fat has been drawn into the stripping tank, heat is applied by any appropriate means to raise the temperature of the fat to 392° F. When the fat temperature reaches 350° F., low pressure steam is introduced into the oil through the sparging tube at the rate of about 1 lb. of steam per hour for every 35 lbs. of fat. The sparging steam is applied for about 3 hours. The vacuum system is maintained throughout the stripping period and the vapors from the steam are continuously removed from the system by the vacuum. At the end of the desired time, the sparging steam is shut off and the fat is quickly cooled by water in the coils to 135°–140° F., under the vacuum of about 5–7 mm. of mercury absolute. After cooling, the vacuum is released with inert gas, preferably nitrogen, and the fat is removed from the stripper. This fat is now ready for use in preparing milk concentrates for drying.

The solid fat is also stripped in accordance with the above procedure.

In order to protect the steam stripped butter fats from oxidation during the processes following stripping, skim milk powder as in the proportion of 0.5%–5% and here 1% by weight of the butter oil is introduced into the butter oil in the stripper 10 minutes prior to completion of stripping. The action of 400° F. heat on skim milk solids in contact with the oil results in the formation of substances having excellent antioxidative properties. The charred milk solids which result are removed from the fat by filtration. In developing these antioxidative products other refined fatty glyceride, edible oils may be substituted for the butter fat, as, for instance, cottonseed, corn, or soyobean oils, in equal proportion by weight.

The liquid fat after stripping is brought to a temperature of about 120° F. and blended and homogenized into the skim milk concentrate prepared as above, also at a temperature of about 120° F., in proportions of 1 part fat to 1.15–1.25 (ordinarily 1.18) parts of milk solids-not-fat. The total solids content of this mixture is adjusted for drying by the addition of water. This concentrate is then spray dried to give a cream powder of 43.5%–45.5% (usually 45.0%) fat at a moisture level of 2.0%–3.0% (preferably 2.0%).

The stripped fat, solid at 70° F., is brought to a temperature of about 140° F., blended and homogenized into the skim milk concentrate, prepared as above at a temperature of about 140° F. in the proportion of 1 part of fat to 4.6–5.5 (preferably 5.0) parts of milk solids-not-fat. This concentrate is then spray dried to give a low fat milk powder of 15.0%–17.2% (usually 16%) fat at a moisture level of 3.0%–4.0% (preferably 3.0%).

The final product is prepared by mechanically blending the two above prepared powder components in proportions to give a powder of 26%–28% fat, as desired. For example, a blend of 41.5 parts of a 45% liquid fat cream powder at 2.0% moisture and 58.5 parts of a 16% solid fat low-fat-powder at 3.0% moisture results in a whole milk powder of 28.03% fat at 2.58% moisture that mixes and disperses in about 10 seconds when stirred into water at room temperature.

The whole milk powder thus prepared had a total fat content substantially normal in all respects to average butter fat, except that the liquid fat and the solid fat are not associated in the same powder particle.

The rate of dispersion of this blended whole milk powder is superior to a whole milk powder prepared from a normal whole milk concentrate because it is a mechanical blend of two separately very dispersible powders. The liquid fat cream powder component is readily dispersible due to the fact that, being liquid at the average reconstitution temperature, it separates readily and allows the solids-not-fat content to become easily wetted and dispersed by the added water. The solid fat low-fat-powder is readily soluble because (1) there is a high proportion of solids-not-fat in relation to the fat; (2) the fat remains solid at normal storage temperatures and migration to form a watertight film around the powder particles is at a minimum; and (3) the powder porosity is increased to overcome the tendency of "balling" or formation of lumps which are wet on the outside and dry on the inside.

*Example 2*

An instant milk powder in which the fat is composed largely of unsaturated and short-chain fatty acids, is produced by a mechanical blend of the 70° F. liquid fat cream powder and skim milk powder, each of which is produced in accordance with Example 1, hereinabove. A blend of 62 parts of a 45% fat cream powder (in which the fat used is entirely the winterized liquid fat) and 38 parts of skim milk powder gives a milk powder of 28% fat in which the fat is low melting and suitable for nutrition in cases in which unsaturated fats are desired.

*Example 3*

A milk powder of 28% fat content, in which the fat is composed largely of high melting point fat, is prepared by drying the concentrate resulting from the homogenized blend of 70° F. solid fat and concentrated skim milk produced in accordance with Example 1, hereinabove.

To insure good dispersion on reconstitution, the proportion of solid fat should not exceed 47% of the total solids.

If fat solubility is not a factor of importance, then the maximum fat content is limited only by the amount that may be dried to powder form.

The milk powder in which the fat is high melting is useful in ice cream, milk chocolate, and glazing materials. It does not feather but imparts good color when added to hot coffee. The wettability of such a powder is increased by addition of lactose, as in the amount of 20%–50% of the final mix, to increase the density and decrease the lumping tendency.

*Example 4*

A cream powder which will disperse in water without becoming specky is prepared from the winterized (70° F.) liquid butter fat, produced in accordance with Example 1, hereinabove and the skim milk concentrate produced in accordance with said Example 1, in the proportions of 1 to 1.15, respectively, by blending the two, homogenizing and spray drying as in Example 1 to provide a cream powder having a butter fat content of 47%. It is noted that no additives or processes designed specifically to stabilize the protein are required.

*Example 5*

A cream powder which will disperse in water is prepared from the witnerized (70° F.) solid butter fat produced in accordance with Example 1, hereinabove and the skim milk concentrate produced in accordance with said Example 1 in the proportions of 1 to 1.15, respectively, by blending the two, homogenizing and spray drying as in Example 1 to provide a cream powder having a butter fat content of 47%. It is noted that no additives or processes designed specifically to stabilize the protein are required.

*Example 6*

A flavor stabilizing agent or antioxidant in concentrated form for use in fat-containing milk products and other fatty glycerides is prepared by first steam-stripping butter fat at about 400° F., as in Example 1, employing a reduced pressure of about 5 mm. of mercury absolute, during which about 1 lb. of steam per hour for every 35 lbs. of fat is introduced for about 3 hours. The vacuum system is maintained throughout the stripping period and the vapors from the steam are continuously removed from the steam by the vacuum. Next, while still at 400° F. and under the same vacuum, 25% skim milk solids by weight of butter fat is added to the butter fat. A temperature of charring, such as the same 400° F. at 2 mm. of mercury absolute pressure is maintained for 10 to 15 minutes, the fat cooled to 120° F., the vacuum released with nitrogen gas and the fat filtered to remove the charred milk solids. The filtrate is an excellent antioxidant and flavor stabilizing agent. It may be employed as a stabilizing agent by adding it in the ratio of about 1 lb. to 25 lbs. to glyceridic oil as part of glyceridic oil component of margarine, baby foods with a butter fat component, candy having a fat component, such as caramels, etc.

In producing the flavor stabilizing agent of the foregoing example, varying proportions of the skim milk solids by weight of butter fat may be employed, such as 1 to 25% by weight of the butter fat, or up to about 50% by weight of the butter fat.

*Example 7*

A whole milk powder of the blended type is made from the unstripped, winterized butter fats and skim milk concentrate which will not show the normal heat effect on presently manufactured whole milk powder and will be improved solubility-wise. The concentrated antioxidant produced in accordance with Example 6 is introduced, in amount corresponding to 1% of total final milk solids, to the butter oil. The butter oil with the antioxidant is then winterized as in Example 1 and the winterized fractions, without steam stripping, blended with skim milk concentrate as in Example 1 and dried to produce a whole milk powder containing 28% butter fat. Lactone development is reduced due to the omission of high-heat or steam stripping treatment of the butter fat. The antioxidant was found to retard development of oxidation flavors.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

We claim:
1. A whole milk powder comprising a mixture of the following separately formed components: (1) non-fat milk solids with winterized liquid butter fat and (2) non-fat milk solids with butter fat that is solid at a temperature within the range 60°–85° F. and that consists essentially of the fraction of fat which separates in solid form on cooling molten butter fat to winterizing temperatures, the proportion of total fat in the said mixture approximating the fat content of whole milk powder.

2. The milk powder of claim 1, the proportion of the liquid butter fat being approximately 1 part by weight for 1–3 parts of the non-fat milk solids in component (1) and the proportion of the solid butter fat being approximately 1 part by weight for 2–5 parts of the non-fat milk solids in component (2).

3. The milk powder of claim 1, the said two components being blended in proportion to make the total fat content at least 1 part by weight for about 2.47 parts of non-fat solids in the whole milk powder.

4. The milk powder of claim 1, the said liquid fat and solid fat consisting essentially of fatty glycerides that are non-distillable at 350° F. and a pressure corresponding to about 2–7 mm. of mercury.

5. A milk powder consisting essentially of the product of spray drying a homogenized blend of winterized liquid butter fat with an aqueous dispersion of non-fat milk solids.

6. A milk powder consisting essentially of the product of spray drying a homogenized blend of solid butter with an aqueous dispersion of non-fat milk solids, the solid butter fat consisting essentially of the fat which separates in solid form from molten butter fat on cooling to winterizing temperatures.

7. The process of making a milk product which comprises homogenizing approximately 1 part of winterized liquid butter fat with an aqueous dispersion of 1–3 parts of non-fat milk solids, homogenizing 1 part of solid butter fat that consists essentially of the fat which separates in solid form from molten butter fat on cooling to winterizing temperatures, at a temperature above the melting point of the said solid fat, with 2–5 parts of non-fat milk solids dispersed in water, spray drying separately the two homogenized mixtures, and then blending the two resulting powders in proportions to establish the fat content required for the said milk product.

8. The process of claim 7 wherein the proportions in which the said resulting powders are blended establish the total fat content at about 28% of the product of the said blending.

9. The process of making a milk product which comprises homogenizing approximately 1 part by weight of winterized liquid butter fat with an aqueous dispersion of 1–3 parts of non-fat milk solids and spray drying the homogenized mixture.

10. The process of making a milk product which comprises homogenizing approximately 1 part by weight of solid butter fat from a winterizing step with an aqueous dispersion of 2–5 parts of non-fat milk solids and spray drying the homogenized mixture.

References Cited in the file of this patent

UNITED STATES PATENTS

| | | |
|---|---|---|
| 694,100 | Hall | Feb. 25, 1902 |
| 742,322 | Hopkins | Oct. 27, 1903 |
| 1,554,151 | White | Sept. 15, 1925 |
| 1,808,730 | Bornegg | June 2, 1931 |
| 2,673,155 | Turnbow | Mar. 23, 1954 |